United States Patent [19]
Hensley

[11] Patent Number: 4,826,609
[45] Date of Patent: May 2, 1989

[54] FILTER MEDIA FOR FILTER SYSTEMS

[76] Inventor: Clifford J. Hensley, P.O. Box 6847, Odessa, Tex. 79767

[21] Appl. No.: 100,573

[22] Filed: Sep. 24, 1987

Related U.S. Application Data

[63] Continuation-in-part of Ser. No. 1,912, Jan. 9, 1987.

[51] Int. Cl.<sup>4</sup> ............................................. B01D 23/24
[52] U.S. Cl. ................................... 210/792; 210/807; 210/503
[58] Field of Search ................................ 210/792–796, 210/807, 269, 275–279, 286, 289–291, 503

[56] References Cited

U.S. PATENT DOCUMENTS

| | | | |
|---|---|---|---|
| Re. 25,761 | 4/1965 | Hirs | 210/108 |
| 2,733,138 | 1/1956 | Clark | 51/303 |
| 3,550,774 | 12/1970 | Hirs | 210/67 |
| 3,557,955 | 1/1971 | Hirs | 210/67 |
| 3,737,039 | 6/1973 | Hirs | 210/269 |
| 3,780,861 | 12/1973 | Hirs | 210/80 |
| 3,992,291 | 11/1976 | Hirs | 210/23 R |
| 4,197,205 | 4/1980 | Hirs | 210/275 |
| 4,496,464 | 1/1985 | Hensley | 210/792 |

Primary Examiner—Ivars Cintins
Attorney, Agent, or Firm—Marcus L. Bates

[57] ABSTRACT

A stream of contaminated liquid flows into a vessel, through a filter media comprised of at least 50% pecan hulls, while clean liquid exits the vessel, leaving the contaminants deposited on the filter media. The deposited contaminants are scrubbed from the media by circulating the media along a toroidal flow path within the vessel until the contaminants have been transferred from the media into the liquid. The scrubbing action is achieved by a pump suction which is spaced from a pump discharge. The pump discharges through a perforated nozzle. The nozzle extends through a housing. An annulus is formed between the nozzle and the housing. Dirty scrub water flows from the pump, through the nozzle perforations, into the annulus, and away from the vessel, while at the same time the toroidal flow path is maintained.

8 Claims, 3 Drawing Sheets

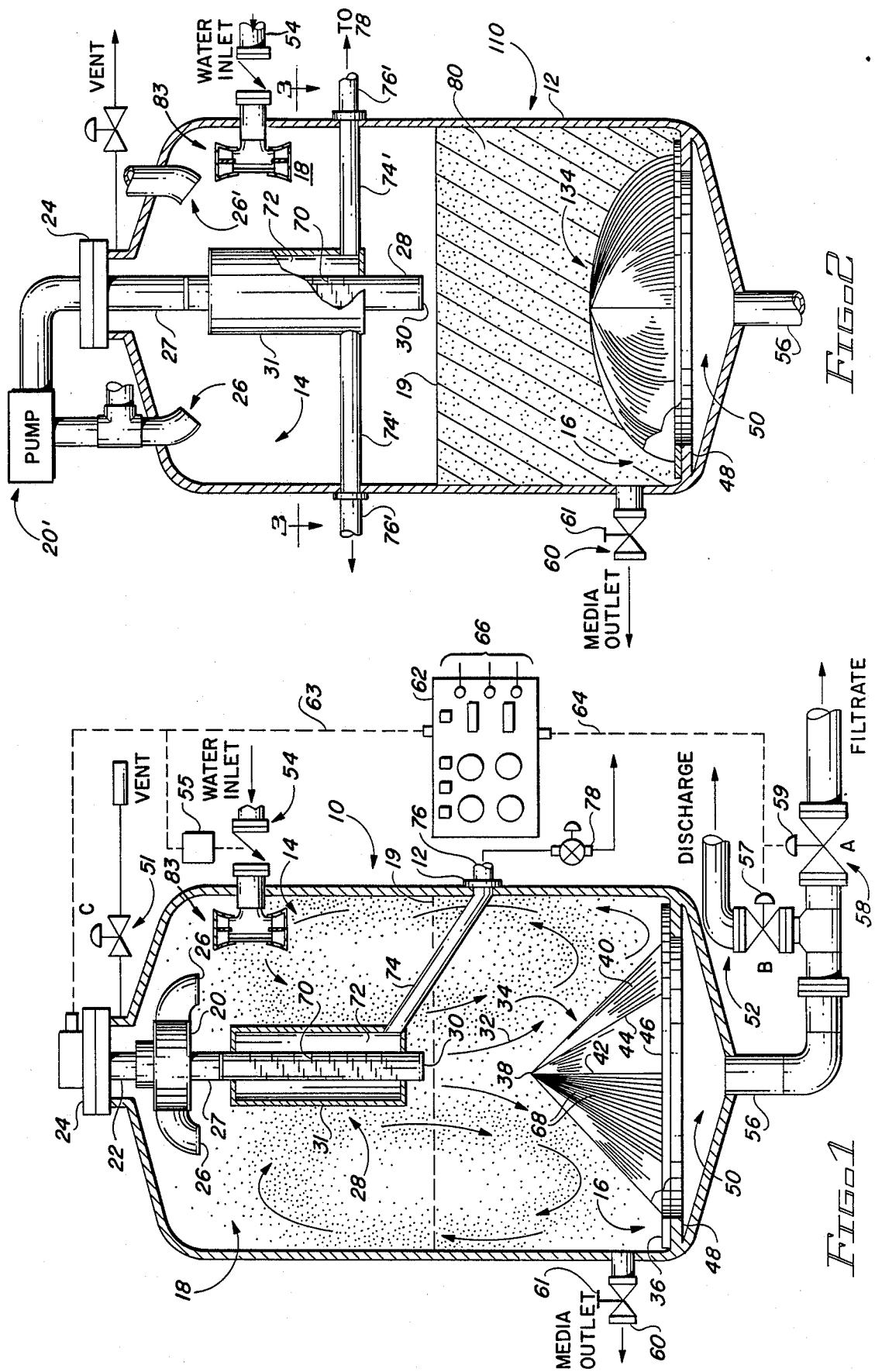

04,826,609

FILTER MEDIA FOR FILTER SYSTEMS

RELATED PATENT APPLICATIONS

This patent application is a continuation in part of my previously filed patent application Ser. No. 07/001,912 filed Jan. 9, 1987.

Reference is made to my Disclosure Document No. 154,888 filed Aug. 18, 1986.

BACKGROUND OF THE INVENTION

In my prior U.S. Pat. No. 4,496,464, there is disclosed a filter system that has a filter media comprised of particles of filter material contained within a vessel. Liquid flows through the vessel and the filter media in a particular manner in order for the filter media to remove unwanted contaminants from liquid. The present invention is an improvement over the filter apparatus set forth in my previous U.S. Pat. No. 4,496,464. Reference is made to the prior art cited in that previous patent.

In my copending patent application Ser. No. 07/001,912 filed Jan. 9, 1987, of which this patent application is a continuation in part, there is disclosed a filter vessel within which a filter media is supported. The media includes pecan hulls, or a mixture of pecan hulls, walnut hulls, an apricot pits. The present invention sets forth in greater detail the use of pecan hulls; as well as a mixture of pecan hulls and walnut hulls; pecan hulls and apricot pits; and, pecan hulls together with varying amounts or apricot pits and walnut hulls.

Walnut hulls have been used for many years as a filter media, as evidenced by the patents to Hirs, U.S. Pat. Nos. 3,992,291 and 3,780,861 and Clark U.S. Pat. No. 2,733,138. In the present invention, the term "walnut hulls" is intended to include the type of hulls or shells that one would expect to be shipped to him should he order walnut hulls from a commercial firm that specializes in the sales of filter media. There are those who allege that black walnut hulls are superior to other walnut hulls and such use is included by the term "walnut hulls". Applicant prefers to use pecan hulls admixed with ordinary walnut hulls and sometime apricot pits as his filter media.

The present invention also sets forth an improved filter system wherein the filter media is scrubbed and cleaned within the vessel, thereby cleaning the media from time to time without removing the media from the vessel.

SUMMARY OF THE INVENTION

This invention is to method and apparatus for filtering contaminants from a stream of fluid. The invention includes the employment of a screen means, which can be of various different geometrical configurations, that is placed within a vessel in a manner to suitably support a filter media. The media is made of a multiplicity of discrete pieces of filter material which substantially will not pass through the screen means, and which includes pecan hulls or a mixture of pecan hulls and walnut hulls. Apricot pits sometimes are included.

During the filtering operation, contaminated liquid flows into the vessel, through the media, through the screen means that supports the media, and away from the vessel, while the contaminants are deposited on the media. The media is periodically subjected to a scrubbing operation wherein it is cleaned or rejuvenated whenever the accumulated contaminants have reached a magnitude which increase the pressure drop across the filter vessel to an unacceptable and predetermined value. The rejuvenation steps include a novel flow system that carries out the functions of fluidization, discharge, settling, and normalization, all of which are carried out while the filter media remains within the vessel.

The fluidization step is carried out by arranging a pump inlet and outlet within the vessel in a manner to form a toroidal flow path, with a second screen means being included within the flow pattern such that flow must occur thereacross. The fluidization step scrubs the contaminants from the filter media by transferring the contaminants into the scrub water. This enables the subsequent discharge step to efficiently remove the contaminated water while relatively clean make-up water flows into the vessel.

The discharge step comprehends flowing the dirty scrub water through the second screen means and away from the vessel. This is achieved by perforating the pump discharge so that it forms said second screen means, extending the pump discharge through an enclosure so that an annulus is formed therebetween, and flowing dirty scrub water from the annulus and away from the vessel.

The vessel is then isolated a sufficient length of time for the cleaned media to settle into a filter bed, and thereafter a normalization step is carried out so that any contaminants in the water contained within the filter vessel are removed from the water. Filtration is then resumed until the pressure drop across the filter media is again elevated to an unacceptable value. At that time, the above rejuvenation process is repeated.

Accordingly, a primary object of the present invention is the provision of method and apparatus for sequentially filtering with and then cleaning a filter media which is used to filter a stream of liquid.

Another object of the invention is to provide method and apparatus by which a contaminated stream of liquid is filtered for one interval of time to provide separation of the contaminants and the liquid, and the filter media is then scrubbed clean in a new and unobvious manner during another interval of time, with the filtering step and cleaning step both occurring within the same vessel.

A further object of this invention is to disclose and provide a method of filtering a stream of contaminated liquid by flowing the contaminated liquid into a vessel having a liquid space and a filter media space; whereupon, the contaminated liquid proceeds to flow through the filter media, thereby leaving the contaminant within the media, so that clean, filtered liquid exits from the vessel; and, thereafter, the filter media is scrubbed without removing the media from the vessel.

A still further object of this invention is to provide an unusual and unobvious filter system having particles of filter media contained therein which filters contaminants from a flowing liquid, and wherein the filter media is made of at least 50% pecan hulls, and occasionally is scrubbed clean of contaminants, and the contaminants removed from the system, with both the scrubbing and filtering action occurring within the same vessel.

Still another object of the present invention is the provision of a filter device having a filter media made mostly from crushed pecan hulls supported by a screen wherein the filtrate travels through the screen, and wherein the filter media is subsequently scrubbed and the scrub water exits the vessel in a novel manner.

Another object of this invention is the provision of an improved filter apparatus that utilizes pecan hulls as the filter media, or at least part of the media.

A further object of this invention is the provision of a filter media comprised of pecan hulls and another media comprised of a mixture of pecan hulls, walnut hulls, and apricot pits.

These and various other objects and advantages of the invention will become readily apparent to those skilled in the art upon reading the following detailed description and claims and by referring to the accompanying drawings.

The above objects are attained in accordance with the present invention by the provision of a method for use with apparatus fabricated in a manner substantially as described herein.

BRIEF DESCRIPTION OF THE DRAWINGS

FIG. 1 is a part diagrammatical, part cross-sectional, side view of a filter apparatus made in accordance with the present invention;

FIG. 2 is a part cross-sectional view of another embodiment of the present invention;

DETAILED DESCRIPTION OF THE PREFERRED EMBODIMENTS

Figure 3:
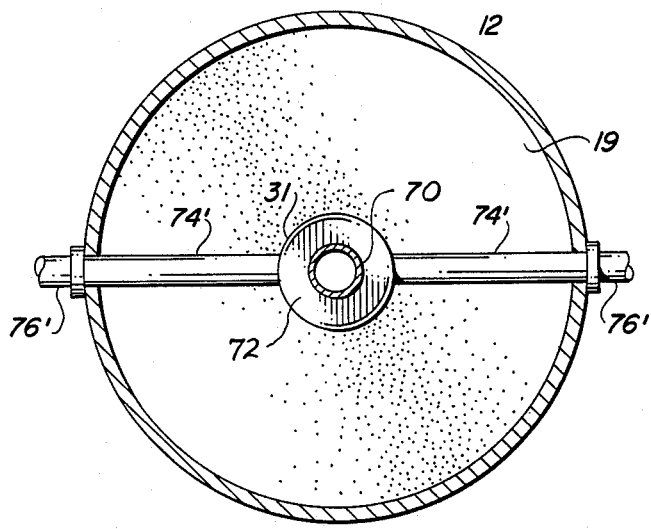
FIG. 3 is a cross-sectional view taken along line 3—3 of FIG. 2.

In the figures of the drawings, and in particular FIG. 1, there is disclosed a filter system 10 made in accordance with the present invention. The system 10 includes a vessel 12 that forms an enclosure 14. The enclosure 14 can be referred to as the lower enclosure 16 and the upper enclosure 18. A pump means 20, which can take on several different forms, includes a support 22 by which the pump 20 is suspended from a manhole assembly 24 located at the upper terminal end of the vessel 12.

The pump 20 is commercially available and includes a suction 26 and an outlet 27. The outlet 27 is connected to a scrub water discharge apparatus 28. Numeral 30 indicates the end of a nozzle 70 which directs flow as indicated by arrows 32. The outlet 30 of the nozzle is shown spaced above and perpendicularly disposed respective to a fill-line 19 of the filter media; however, the outlet can be located at other elevations respective to the fill-line 19 if desired.

The arrows at numeral 32 indicate a toroidal flow pattern with the discharge apparatus 28 being located at the center of the toroid. The toroidal flow pattern is effected by fluid flow into suction 26 and fluid flow from the nozzle outlet 30.

The scrub water discharge apparatus 28 includes annular discharge chamber 72 connected to discharge pipe 74 by which dirty scrub water can be discharged from the vessel at discharge 76. Flow control valve means 78 is connected to the discharge 76.

A screen means 34, which can take on several different forms, is located in the lower enclosure 16. The lower circumferentially extending edge of the screen 34 terminates in attached relationship respective to attachment flange 36. The screen 34 includes an apex 38 which is axially aligned with the discharge apparatus 28. The screen means 34 can be made of a plurality of individual elements 40 which are made triangular in form and have adjacent opposite sides 42, 44; a base 46; and, a common apex 38. The sides 42, 44 are attached to one another while the base 46 is attached to flange 36. The flange 36 is supported by means of the illustrated lower flange 48 that is attached to the outer shell 12 that forms enclosure 14.

The screen 34 separates the lower chamber 16 into a filtrate chamber 50 and leaves ample space for the filter bed as indicated by fill-line 19. This arrangement also provides ample space at upper enclosure 18 for a dirty water chamber. As disclosed in FIG. 1, the filter bed is in the act of being scrubbed or rejuvenated and therefore has been fluidized and is flowing in a toroidal flow path.

Discharge valve 52 can momentarily be connected to the inlet 54, and thereafter can be connected to an appropriate disposal facility for disposing of dirty water, except in those instances where the contaminant is valuable, whereupon valve 52 would be connected to a collection and holding facility.

Valve 51 removes compressible fluid from the uppermost end of the upper enclosure 18.

Water inlet 54 is connected to enable the vessel to receive a supply of contaminated liquid that must be filtered. Filtrate valve 58 is connected to provide a flow path for the clean filtered water. Valve 60 provides a convenient means by which all of the filter media can be removed from the enclosure 14 when it is desired to renew the filter media. The filtrate chamber 50 is connected to pipe 56 which in turn is connected to the tee that accepts valves 52 and 58.

A computerized control panel 62 provides intelligence and sends appropriate signals along conduits 63 and 64 for actuating valves 52, 54, and 58, and for controlling the action of pump 20 in a logical, predetermined, sequence as will be more fully appreciated after this disclosure has been digested. Numerals 55, 57, and 59 indicate a control device for actuating the valves 54, 52, and 58. Numeral 66 indicates power input into the control panel 62.

In the embodiment of the invention set forth in FIG. 2, the settled filter media 80 is shown supported within the lower enclosure 16 with screen 134 separating the media from the filtrate chamber 50, and with the filter media 80 separating the liquid contained within the upper enclosure 18 from the screen 134.

The pump 20' of FIG. 2 is located externally of the vessel and is connected to receive flow from suctions 26, 26' which are symmetrically supported within the upper end of the vessel and aligned with the toroidal flow path 32 of FIG. 1. The discharge apparatus 28 extends axially down through the manhole 24 and terminates at nozzle outlet 30 and in proximity of the fill-line 19. The filtrate exits at 56 and to the valves 52, 58 (shown in FIG. 1).

The equipment for the apparatus is minimized, so as to keep costs and complexity to a minimum. The filtration unit of FIG. 1 consists of one fluidization pump which is submerged down into the top of the vessel with an easily accessible manway; or, as seen in FIG. 2, an external pump with a discharge apparatus aligned centrally of the vessel; and, one wire screen which, in FIG. 1, is conically shaped (i.e. tee-pee) and welded or otherwise fixed around the inside bottom of the vessel; one inlet pipe leading to the upper end of the vessel comprising a "check" valve; only one outlet pipe which leads from the bottom center of the vessel including one actuated valve 58; and one scrub water discharge valve leading to a suitable disposal facility.

The filter 10 or 110 employs a much more efficient technique as compared to a sand filter. Rejuvenating of the bed requires less time, 20 minutes or less, and produces much less waste discharge volumn than a comparable sand filter.

Filtration and Clean-Up Sequence:

| | |
|---|---|
| 1. Filtration | 30 hours or less |
| 2. Fluidization | 15 seconds |
| 3. Discharge | 12 minutes under normal conditions |
| 4. Settling | 1 minute |
| 5. Normalization | 1 minute |
| Return to Step 1. | |

As seen in FIG. 2, dirty water is pumped by a feed pump (not shown) from the dirty water source, through the inlet pipe 54 near the top of the vessel 12. The water flows down through the media bed 80, then out through the bottom conical wire screen 134 where solids are trapped and remain in the media bed and the clean water exits down through the clean water outlet 56. The filtration mode will be controlled by a timer which can be set to accommodate different types and severity of water contaminants. If the water is much more contaminated than well water, the filtration sequence will have to be of much shorter duration, and the media bed rejuvenated more often. If the water contains low amounts of solids, the filtration time can be extended because rejuvenation and discharge will not be needed quite as often.

When the time has elapsed for the filtration mode, or when the pressure drop across the bed 80 has unduly increased, the valve 58 (outlet for clean water in FIG. 1) will shut off and no more dirty water will enter the vessel through the inlet pipe 54. The fluidization pump 20 will turn on and begin pulling the water and media up through the top of it by suction. The water and media will flow down the discharge apparatus 28 and back out into the vessel as seen at 32 in FIG. 1, for example. By flowing the water through the pump 20, pump outlet 27, nozzle 70, nozzle outlet 30 and down through the middle of the vessel, it will be directed onto the center of the screen 34 or 134 and flow down the sides thereof and thereafter hit the side of the vessel and then flow back up to the pump intake 26. This flow will form what is known as a toroidal flow path. The fluidization mode will last 15 seconds, for example, to assure that the entire bed has formed into a toroid for mixing.

In FIG. 1, once the bed has been fluidized, the discharge outlet valve 78 will then be opened and the pump 20 will remain turned on to continuously mix and scrub the bed. The nozzle screen 70 which previously served solely as a discharge tube leading to the nozzle outlet 30 will now take on a new task of cleaning the dirty scrub water from the media. This unique method of utilizing a discharge nozzle 70 as a dual-function apparatus is an object of this invention. The discharge screen 70 will now simultaneously act as a separator as well as a nozzle. It will hold back the media, but the unwanted solids, dirt, and other contaminants will be washed through the screen openings, into the dirty scrub water annulus 72, through piping 74 where the water is transported to the discharge 76 and through valve 78. Discharge time may be only twelve minutes under normal water filtering conditions.

In FIG. 1, once the discharge step is complete, the outlet discharge valve 78 will close and the fluidization pump 20 will turn off. This allows the media to gravitate back onto and around the primary screen to form a rejuvenated bed 80. The time allowed for settling is about one minute.

In FIGS. 1 and 2, once the bed has settled, the filter control 62 (of FIG. 1) will move the system into a prefilter or normalizing step. This is achieved by opening the outlet discharge valve 52 (of FIG. 1) in order that the extra water and solids can flow out through the discharge valve and thereby prepare the bed for another filtration cycle. At the end of this normalization step, the valve 58 will open, allowing clean water to be transported to wherever it is needed once the filtration begins again, then valve 52 will be closed.

The control panel 62 can be a computer which is programmed to switch the variables of the system to achieve various modes of operation in accordance with the desired program selected for a specific filter operation. On the other hand, the control panel 62 can be equipped with a cam-timer which will control the above filtration sequence. The timer will control the opening and closing of the actuated valves 52, 58, 54 and 78; and, the pump will be turned off and on by the panel.

The discharge from valve 52 can be backed into inlet 54 so that after the scrubbing, discharge, and settling steps, the normalization step can be carried out by closed circuit flow from 56, 52, 54, through the vessel and to 56, thereby filtering contaminants from all of the water contained in the closed circuit.

The filter media used will be crushed pecan hulls for a tight packed, more efficient filtration. English walnut hulls can be added for a somewhat looser packing and to improve the life of the media and wear on the vessel. It is also possible to use any mixture of the following materials: crushed walnut hulls, crushed pecan hulls, and crushed apricot pits.

Reference is made to my previous U.S. Pat. No. 4,496,464 for the pump horsepower, vessel diameter and length, and the amount of filter media a typical filter installation may require, as well as the details of the wedgewire screens 34, 134, and 70.

In FIG. 2, there is a small amount of filter media traveling outside the vessel during the cleaning or scrubbing step. Such an operation nevertheless is considered to fall within the claimed language "scrubbing the media while the media is contained within the vessel".

Figure 4:
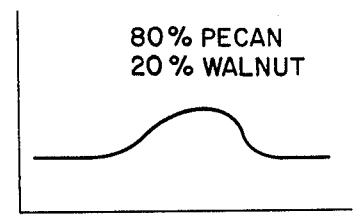
FIGS. 4-6 set forth a plot showing the use of a filter media according to the present disclosure.

This invention comprehends the use of crushed pecan hulls as the filter media 80, FIG. 2. Where the size distribution of the contaminants is a bell-shaped curve as seen in FIG. 4, a mixture of 80% pecan hulls and 20% walnut hulls is the preferred media 80, FIG. 2. This provides a tightly packed bed 80 of pecan hulls that is propped open with the walnut hulls sufficiently to achieve a reasonable cycle time. This mixture is diagrammatical shown in FIG. 9.

Figure 6:
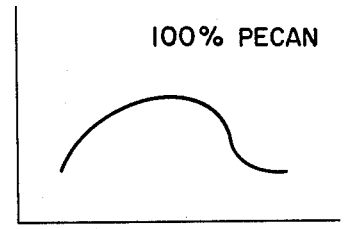
Figure 7:
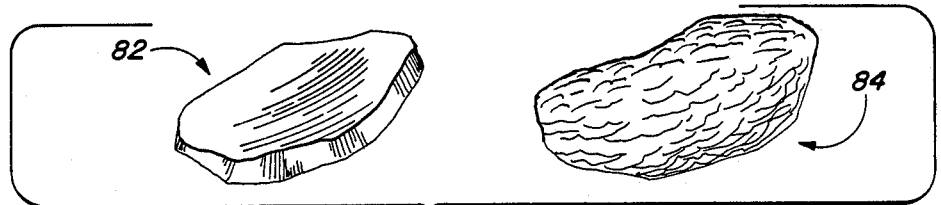
FIG. 7 is an enlarged, idealized, perspective view of the filter media disclosed herein.
Figure 8:
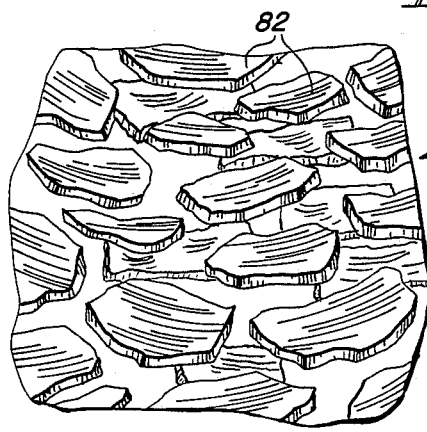
FIG. 8 is a fragmentary, enlargement of some of the filter media of this disclosure.
Figure 9:
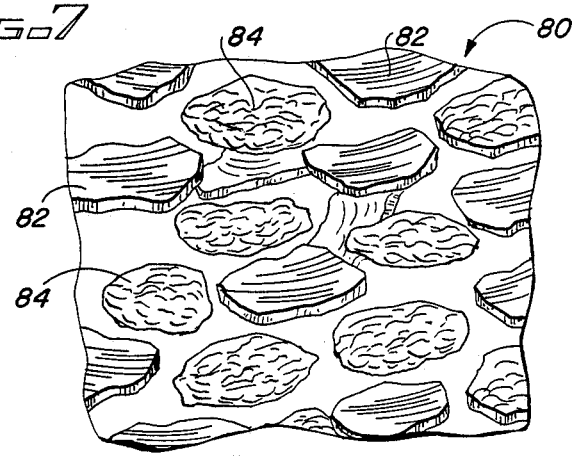
FIG. 9 is a fragmentary, enlarged, representation of another filter media made in accordance with this invention; and, FIG. 10 is a fragmentary, broken, part longitudinal, part cross-sectional view of the filter apparatus disclosed in FIGS. 1 and 2.

In FIGS. 7–9, the bed 80 or 180 is comprised of pecan hulls 82, walnut hulls 84, or a mixture thereof. The use of pecan hulls alone is shown in FIGS. 6 and 8, and should be employed where most of the contaminants are very small and consequently the media needs to be a tightly packed bed. The 100% pecan hull filter media maintains a long cycle time, is very efficient, and provides advantages over other known filter media.

Figure 5:
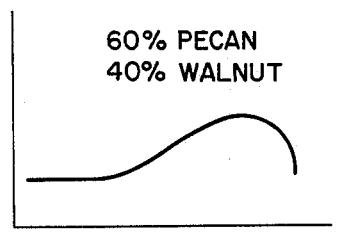

Walnut hulls should be added to the pecan hulls in increasing amounts as the size of the contaminants increases. In FIG. 5, the average size of the contaminants has further increased beyond that set forth in FIG. 4 and therefore the percentage of walnut hulls contained within the mixture of pecan and walnut hulls has been increased to 40%, as seen in FIG. 5.

In FIG. 7, the pecan hulls are seen to be in the form of a sphere, whereas the walnut hulls are more like an irregular ball having a much greater thickness as compared to the pecan hull particles. As seen in FIG. 9, the walnut hull particles prop open the layered pecan hulls and thereby provide a "looser" bed as compared to the use of 100% pecan hulls or FIG. 8. The looser bed of FIG. 9 is advantageously employed in filtration conditions such as set forth in FIG. 5 whereas the tight bed of FIG. 8 is preferred in conditions such as set forth in FIG. 6.

The tight bed 180 that uses 100% pecan hulls would be employed for filtering sea water, for example, which has an average particle size of 2 micron or greater and 50 parts per million (ppm) total suspended solids under normal operating conditions; whereas the loose bed of FIG. 9 is preferred for filtering plant water having an average particle size of 2 micron or greater and 50 ppm total suspended solids and 100 ppm oil. These two extremes are illustrated in FIGS. 5 and 6, with FIG. 4 being somewhere therebetween.

The walnut hulls can therefore be said to be a "propping agent" or a "propant" in the sense that it props open and thereby loosens the bed of pecan hulls, thereby modifying the pecan hull bed for use in filtering liquids admixed with increasing particle size contaminants.

EXAMPLE: A filter bed comprised of 100% pecan hulls weighing 150 pounds was placed in a vessel 1 foot in diameter and 11 feet in height.

Sea water was pumped through the filter media at a rate of 15 gpm. The filtrate was cleaned of most material above 2 micron particle size. The cycle time was as follows:

| Filtration | 27 hours |
| Fluidization | ½ minute |
| Discharge | 15 minutes at 15 gpm |
| Settling | 1 minute |
| Normalization | 1 minute. |

Should the above filter system be used to filter a contaminated stream of plant liquid having 200 ppm oil, 200 ppm solids of 2 micron size or greater, it is anticipated that the following cycle of operation would be encountered:

| Filtration | 4 hours |
| Fluidization | ½ minute |
| Discharge | 15 minutes |
| Settling | 1 minute |
| Normalization | 1 minute |

This unsatisfactory cycle time is due to all of the contaminants being removed and concentrated onto the top surface 19 of the bed 80 which rapidly accumulates into an impermeable barrier which elevates the pressure drop across the vessel to an unacceptable value. Consequently, the bed must be rejuvenated often as compared to a looser bed made of a mixture of pecan and walnut hulls, as seen in FIGS. 4, 5, and 9, for example.

Should the above filter system be adjusted to a mixture of 60% pecan hulls and 40% walnut hulls, the following results are anticipated:

| Filtration | 18 hours |
| Fluidization | ½ minute |
| Discharge | 15 minutes |
| Settling | 1 minute |
| Normalization | 1 minute |

This is an acceptable cycle time. Should the walnut hulls be increased to more than 50%, for example, the filtrate at 56 may indicate that the contaminants were not satisfactorily being removed from the contaminated liqiud and under these circumstances, it would be necessary to increase the pecan hull ratio until the contaminants are properly removed from the liquid. Hence, the ratio of pecan and walnut hulls used as the filter media is adjusted to achieve the desired cycle time and degree of filtration.

Figure 10:
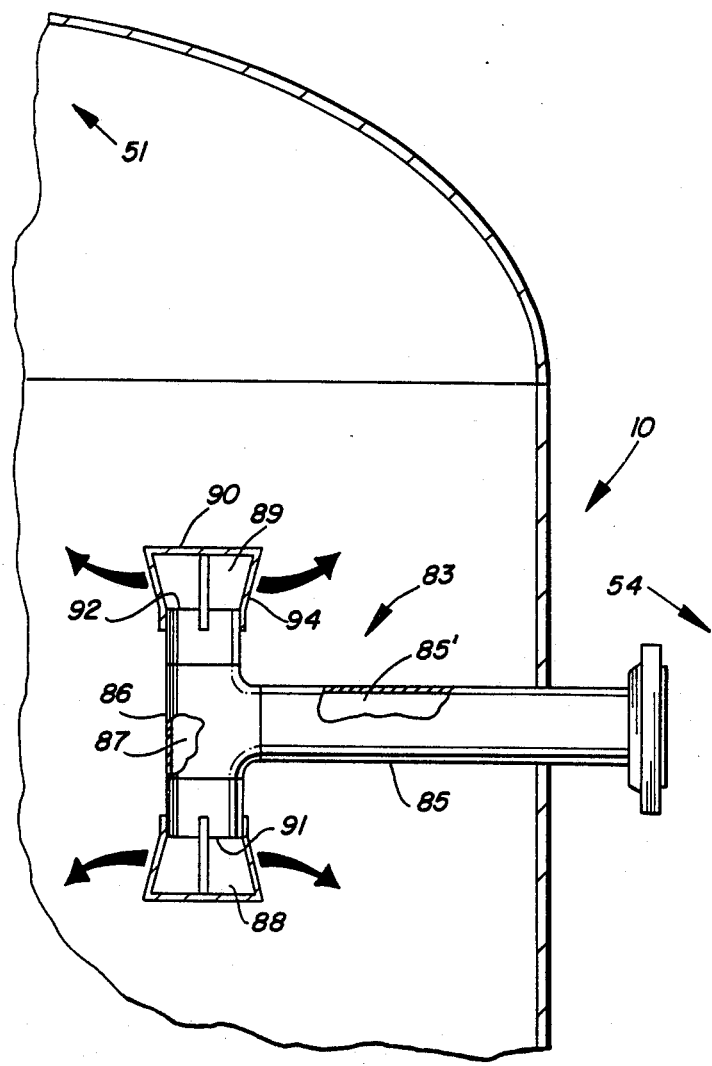

The above example of poor filter performance can be overcome by the provision of the separator apparatus 83 seen in FIGS. 1, 2, and 10. Where the poor performance is due to the presence or oil and other lighter than water fluids present in the contaminated liquid entering the vessel at 54, the separator 83 forces most of the lighter weight material to flow upwards within the vessel and towards the vent, while the heavier components are forced to flow in a downward direction towards the bed. This unusual subcombination of this invention enables most of the lighter components to be removed from the system by flowing the lighter material through th vent and to suitable storage where it can be accumulated. The lighter material, such as oil, is often of significant value.

An unexpected advantage discovered by using separator 83 is that it further enhances the configuration of the bed, and thereby increases the overall filter efficiency. The flow through passageway 85 formed in inlet pipe 85 is divided at tee 86. The divided flow proceeds through passageway 87 and is discharged at upper and lower annular discharge ports 88, 89. The annular opposed discharge ports 88, 89 are formed by flat plate members 90 which are supported in spaced relationship respective to outlet ends 91, 92 by means of a plurality of standoffs 94. The flat plate members 90 are about 1½–2 diameters larger than the tee, and are concentrically arranged respective to outlets 91, 92 of the tee. The plates 90 are spaced about one pipe diameter from the outlets 91, 92. The plurality of standoffs 94 can be any suit able length of rod, and are attached to the opposed ends of the tee. The rods are radially spaced from the central axis of the outlets 91, 92; and, have opposed ends welded to the tee and plate.

Flow through passageway 85 splits at 87 and proceeds through outlets 91, 92. The flow at 88, 89 is emitted as two annular flow paths which enlarge in diameter and decelerate as the flow proceeds radially away from the outlets. This action causes an unexpected small amount of disturbance at the upper surface of the bed 19. Heretofore, the surface of the bed has assumed an irregular configuration with there being a deep dished area due to the jet like action of a prior art inlet. That is, the pipe inlet acts like a nozzle and disturbs the upper surface of the bed during the filtration cycle. The present invention reduces this disturbance and provides a more regular bed surface.

Further, oil and other light ends are separated from the inlet liquid and are withdrawn through the vent, rather than removed by the bed, thereby avoiding contamination of the bed with oil and greatly extending the filtering cycle. The separation occurs because the oil tends to rise towards the top of passageway 85, where it is then entrained by the upwardly flowing liquid which directs the oil phase through the outlet 89 where it continues to rise towards the top of the vessel and is discharged through the vent.

I claim:

1. Method of filtering contaminants from a stream of fluid comprising the steps of:
   (1) placing a first screen means within a vessel;
   (2) placing a filter media upstream of said first screen means and within said vessel, said filter media being made of a multiplicity of discrete pieces of filter material which substantially will not pass through said first screen means;
   (3) flowing contaminated liquid into the vessel, through the media while the contaminant is deposited on the media with the clean liquid flowing through the first screen means, and away from the vessel;
   (4) cleaning the media of most of the accumulated contaminants while the media predominately remains within the vessel by carrying out the following steps:
      (a) placing the suction of a pump in communication with the liquid contained within the vessel;
      (b) connecting an elongated discharge nozzle to the pump outlet and placing the discharge nozzle within the vessel in spaced relationship respective to said pump suction;
      (c) forming a scrub water discharge chamber about said discharge nozzle; communicating the discharge chamber with the interior of the discharge nozzle by forming a plurality of small openings through the wall of the discharge nozzle of a size to preclude significant flow of media therethrough and which admits flow of contaminants therethrough;
      (d) flowing contaminated liquid contained within said vessel into said pump suction, through said pump discharge, and through said nozzle at a rate to cause substantially all of the liquid and the media to be agitated with great force, thereby scrubbing the media predominantly within said vessel, and causing most of the contaminants to be translocated from the media into the liquid;
      (e) discharging the liquid ladened with contaminants through the small openings in the wall of the discharge nozzle and from the vessel while flowing relatively uncontaminated liquid into the vessel until most of the suspended contaminants have been removed from the vessel;
   (5) reducing the velocity of flow to a value which enables the media to settle into a filter bed;
   (6) repeating step (3).

2. The method of claim 1 and further including the step of using pecan hulls for at least 50% of said filter media.

3. The method of claim 1 wherein said filter media comprises a mixture of pecan and walnut hulls.

4. Method of filtering contaminants from a liquid, comprising the steps of:
   (1) flowing the contaminated liquid through a vessel having end portions; enclosing a filter media within one end portion of the vessel, using the other end portion of the vessel for holding the liquid;
   (2) placing a first screen means within said one end portion of the vessel and supporting most of the media upstream of the first screen means, said first screen means is of a size to substantially preclude the media from passing therethrough;
   (3) flowing contaminated liquid into the other end portion of the vessel and conducting the flow through the filter media, through the first screen means, and away from the vessel while the contaminant is deposited on the media;
   (4) carrying out step (3) until the load of the contaminants removed by the filter media produces a pressure drop across the filter media which is significantly greater than the pressure drop at the commencement of step (3); and then:
   (5) scrubbing the contaminants from the filter media by aligning a nozzle means in spaced relation respective to said first screen means; and, forming a scrub water discharge chamber about said nozzle means, and connecting the interior of the nozzle means to the discharge chamber by a second screen means;
      flowing liquid from the interior of the vessel, through the nozzle means, and towards the filter media, thereby effecting a tortious flow path;
      flowing liquid through the second screen means, into the discharge chamber, and away from the vessel until most of the suspended contaminants have been removed from the liquid contained within the vessel;
   (6) flowing a relatively clean liquid into the vessel while the contaminant laden liquid is removed from the vessel, thereby leaving the scrubbed media within the vessel;
   (7) redepositing the scrubbed media in said one end portion of the vessel, and then repeating step (3).

5. The method of claim 4 and further including the steps of:
   carrying out the scrubbing step while make-up liquid is added to the vessel at substantially the same rate that the concentrated contaminated liquid is removed through the second screen means;
   discontinuing the flow of make-up liquid to enable the contents of the vessel to be dormant while the media gravitates towards the bottom of the vessel;
   flowing liquid in a closed circuit which includes the vessel; and repeating step (3).

6. The method of claim 4 and further including the step of using pecan hulls for at least 50% of said filter media.

7. The method of claim 4 wherein said filter media comprises a mixture of pecan and walnut hulls.

8. The method of claim 4 wherein step (3) is carried out by separating the stream of contaminated liquid that flows into said other end of the vessel into a downward and upward flow paths, whereby any heavy component of the stream flows along the downward flow path and any light component of the stream flows along the upward flow path.

* * * * *

UNITED STATES PATENT AND TRADEMARK OFFICE
CERTIFICATE OF CORRECTION

PATENT NO. : 4,826,609

DATED : May 2, 1989

INVENTOR(S) : CLIFFORD J. HENSLEY

It is certified that error appears in the above-identified patent and that said Letters Patent is hereby corrected as shown below:

Column 1, line 30, substitute --of-- for "or";

Column 7, line 23, substitute --of-- for "or";

Column 8, line 37, substitute --of-- for "or";
Line 46, correct the spelling of "the";

Column 9, line 18, substitute --85'-- for "85".

Signed and Sealed this

Sixth Day of February, 1990

*Attest:*

JEFFREY M. SAMUELS

*Attesting Officer*    *Acting Commissioner of Patents and Trademarks*